Figure 1:
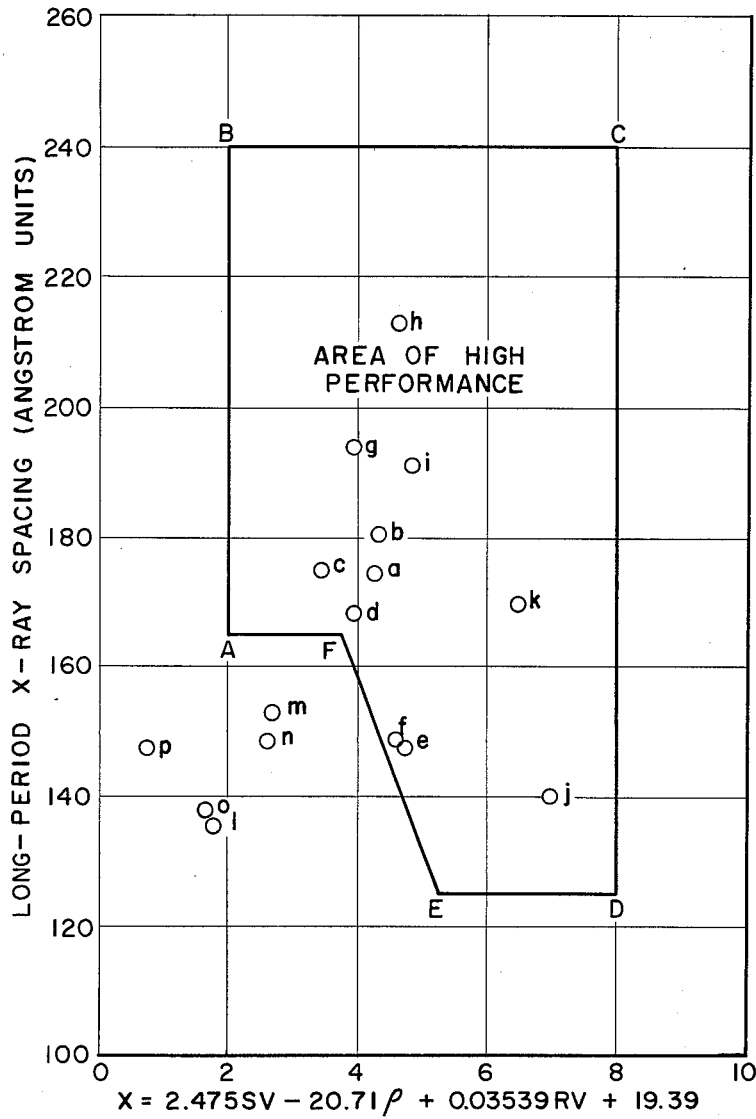

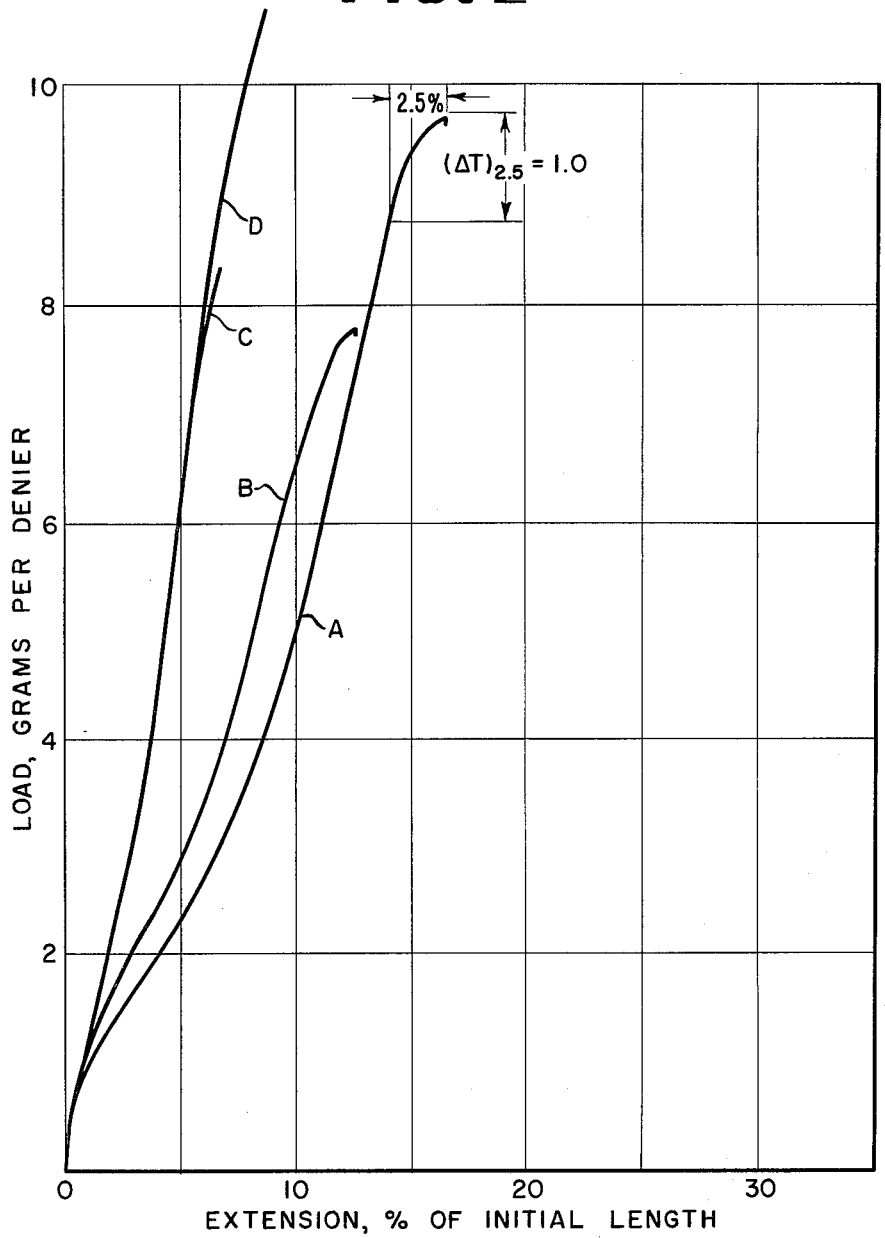

United States Patent Office 3,216,187
Patented Nov. 9, 1965

3,216,187
HIGH STRENGTH POLYETHYLENE
TEREPHTHALATE YARN
William A. Chantry and Alberto E. Molini, Kinston, N.C.,
assignors to E. I. du Pont de Nemours and Company,
Wilmington, Del., a corporation of Delaware
Filed Dec. 27, 1963, Ser. No. 333,856
9 Claims. (Cl. 57—140)

This application is a continuation-in-part of our application Serial No. 163,644, filed January 2, 1962.

This invention relates to elastomeric articles reinforced with textile materials. More specifically, it relates to the production of improved high strength polyethylene terephthalate fibers which are particularly useful in the preparation of reinforced elastomeric structures.

Pneumatic tires are subjected to severe operating conditions because of the high speeds of automobiles and high landing speeds of airplanes. Attempts to improve the structure of such tires are constantly underway with a view to improving resistance to severe impact and high temperatures encountered in many situations. The best tires produced commercially have been reinforced with cords prepared from nylon fibers because of the high strength, low moisture sensitivity and excellent resistance to flex fatigue characteristic of nylon. Nylon reinforced tires have, however, been found deficient in that they show a tendency to grow in use (inflation growth) and a tendency to develop "flat spots" which produces a rough ride in vehicles fitted with such tires. On the other hand, tires reinforced with cords prepared from the newer polyethylene terephthalate fiber do not show growth in use and do not flat spot, but have suffered in comparison with nylon from low strength and low resistance to flex fatigue. The lower strength of polyethylene terephthalate cords necessitates the use of a greater weight of cord, in comparison with nylon, to produce a tire of given bursting strength. The greater amount of cord required is known to produce higher running temperatures and thereby cause faster rates of degradation of both the rubber in the tire and the cord structure itself.

The present invention provides high performance polyethylene terephthalate fibers having a significantly higher strength level in combination with an extensibility suitable for tire cords and similar structures. The invention also provides such fibers having an improved flex fatigue resistance. Furthermore, yarns are provided which show an improved tenacity conversion factor when made into cords, such that their high tenacity is retained in plied and twisted cord structures, thereby making possible the manufacture of reinforced rubber articles of superior performance.

The novel fibers of the present invention have a unique molecular and crystalline internal structural configuration which is defined numerically by the measurements indicated below and described subsequently. This structural configuration is characterized by the following values:

The average distance between crystallites, or between regions of high crystallinity, along the length of individual filaments is such that the "long-period spacing" value, as determined by low angle X-ray scattering measurements, is at least 125 angstrom units and preferably is from 165 to 240 angstrom units.

The molecular orientation along the fiber axis is such that the sonic velocity value (SV), as determined by passing a sound wave having a frequency of 10,000 cycles per second through filaments held under a stretching tension of 3.0 grams per denier, is from 4 to 6 kilometers per second.

The degree of polymer crystallinity is such that the density ($\rho$) is from 1.37 to 1.42 grams per cubic centimeter.

The polymer molecular weight is such that the relative viscosity (RV), as determined for a solution of 10 percent of the polyester in a mixture of 10 parts by weight of phenol and 7 parts by weight of 2,4,6-trichlorophenol, is from 47 to 100 and preferably from 50 to 70.

The combination of the above values is such that the function X, calculated from the formula $$X = 2.475(SV) - 20.71(\rho) + 0.03539(RV) + 19.39$$

is within the range from $X=2$ to $X=8$ and the "long-period spacing" value is within the area surrounded by the solid line ABCDEF in FIGURE 1 of the drawing.

In the drawings, which are graphical illustrations of values referred to herein, FIGURE 1 is plot of long-period X-ray spacing, in angstrom units, as a function of X in the above formula calculated from values given in Example V, and FIGURE 2 shows stress-strain curves of measured load, in grams per denier, as a function of percent extension (abscissa) when 10-inch specimens of yarn (identified subsequently) are stretched at a uniform rate of 0.1 inch second (1%/second).

Referring to FIGURE 1, if the values of sonic velocity, density, and relative viscosity are such that the function X is less than 3.8, then the fibers of this invention must have "long-period spacing" values above 165 angstrom units. Where X is between 3.8 and 5.2, then the "long-period spacing" values must be equal to or greater than the corresponding values found on line EF. If X is above 5.2, then "long-period spacing" values above 125 angstrom units are suitable.

Although we do not wish to be bound by theory, it is postulated that larger distances between crystallites (larger values of long-period spacing) provide more chance for stress equalization among polymer chains connecting these crystallites, which in turn produces stronger filaments.

The novel fibers of this invention are found to have physical properties in a range previously unattained, i.e., breaking tenacities in the range 10 to 15 grams per denier (measured at an elongation rate of 1% per second and referred to denier at break) and filament flex lives of at least 50,000 cycles when tested by repeatedly bending a single filament 180° about a 0.003 inch diameter wire at a rate of 155 cycles per minute. Pneumatic tires reinforced with these fibers are found to be at least equivalent to those reinforced with nylon in strength and flex fatigue while at the same time being much superior to nylon tires in inflation growth and flat spotting properties. Yarn of these fibers which has been drawn to have a break elongation of 8% to 20% is suitable for this purpose, values of 10% to 15% usually being preferred for forming cord to be used as tire reinforcement. Yarn drawn to have a break elongation of 7% to 15% is particularly suitable for other industrial uses, e.g., forming rope, with yarn having values of 8% to 10% generally being preferable for rope.

The fibers of this invention are composed of polyethylene terephthalate containing no more than minor amounts of other ester-forming components, i.e., they are composed of polymer made up of at least 95%, preferably at least 97%, ethylene terephthalate repeating units of the formula:

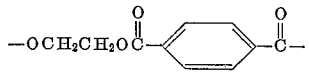

Accordingly, the term "polyethylene terephthalate" as used herein is understood to refer to polymers containing up to about 5 mol percent and preferably less than 3 mol percent of other ester-forming units. Among the other ester-forming units which may be present in these minor amounts may be mentioned diethylene glycol, other polymethylene glycols having 1 to 10 carbon atoms, hexahydro-p-xylylene glycol, other aromatic dicarboxylic acids such as isophthalic acid, bibenzoic acid, and p-terphenyl-4,4''-dicarboxylic acid, cycloaliphatic acids such as hexahydroterephthalic acid, or small amounts of aliphatic acids, such as adipic acid, or a hydroxy acid such as hydroxyacetic acid.

The term "long-period spacing," used herein to describe crystallite spacing within the fiber, is derived from low angle X-ray scattering measurements made by known procedures. X-radiation of known wave length, e.g., $CuK\alpha$ radiation having a wave length of 1.54 angstrom units, is passed through the fiber in a direction perpendicular to the fiber axis and the diffraction pattern recorded by photographic means. Discrete meridional scattering is observed at small angles, i.e., less than about 1°. From a measurement of the displacement of the radiation from a straight line and the geometry of the apparatus, one calculates the repeat distance "$d$" using the Bragg equation $$n\lambda = 2d \sin \theta$$

where $n$ is the constant 1 (first order refraction), $\lambda$ is the wave length of incident radiation, and $\theta$ is the Bragg angle. "Long-period spacing" is the value of "$d$" expressed in angstrom units. A more detailed explanation of methods of determining low angle X-ray scattering may be found in chapter 12 of the book "X-Ray Diffraction Procedures," by H. P. Klug and L. E. Alexander, published by John Wiley & Sons, New York, N.Y. (1954).

The term "sonic velocity" used herein is a polymer structural parameter related to molecular orientation along the fiber axis with higher values of sonic velocity indicating a higher degree of orientation. Sonic velocity relationships and test procedures are described by Charch and Mosely in the Textile Research Journal, vol. 29, page 525 (July 1959). Briefly, sonic velocity, in km./sec., is measured by passing a sound wave having a frequency of 10,000 cycles per second for a known distance through the polymer structure using apparatus known in the art. The sonic velocity values reported herein were measured with the filaments held under a stretching tension of 3.0 grams per denier. The fibers of this invention have sonic velocity values in the range 4 to 6 km./sec.

The degree of crystallinity of a filament is indicated by density measurements. The density values, in grams per cubic centimeter, may be measured in a density gradient tube by observing the equilibrium height of a short sample of filament, free of voids, when suspended in carefully calibrated inert liquid mixtures of varying density prepared from n-heptane and carbon tetrachloride. The filaments of this invention have desnsity values between 1.37 and 1.42 grams/cc.

The term "relative viscosity" refers to the ratio of the viscosity of a 10% solution (2.15 gm. polymer in 20 ml. solvent) of polyethylene terephthalate in a mixture of ten parts of phenol and seven parts of 2,4,6-trichlorophenol (by weight) to the viscosity of the phenol-trichlorophenol mixture, per se, measured in the same units at 25° C. A relative viscosity of 47 corresponds roughly to an intrinsic viscosity of 0.8 measured in the solvent indicated above (intrinsic viscosity is defined as the limit of the natural logarithm of the ratio of solution viscosity to solvent viscosity, divided by the concentration of the polymer in solution, as the concentration approaches zero). Relative viscosity is a measure of polymer molecular weight, and increases with increasing molecular weight. The fibers of this invention have relative viscosity values in the range 47 to 100, and preferably in the range 50 to 70.

The superior fibers of this invention may be prepared by a critical choice of process steps characterized chiefly by supplying to a drawing step a very uniform yarn composed of continuous filaments of polyethylene terephthalate having an optical birefringence in the range 0 to 0.0030, preferably less than 0.0020, and composed of polymer having a relative viscosity in the range 47 to 100, and drawing the yarn 5.7 to 10 times its undrawn length at a yarn temperature between the glass transition temperature and the melting point, with the final part of the drawing taking place at a temperature above 135° C. The undrawn yarn supplied to the drawing step is prepared by melt spinning high molecular weight polyethylene terephthalate to produce filaments having a relative viscosity in the range 47 to 100, with the tension in the spinning threadline in the zone of solidification being maintained sufficiently low to produce solidified filaments having an optical birefringence in the above specified range.

It is essential that the polymer supplied to the melt spinning apparatus have sufficiently high molecular weight that the filaments produced have a relative viscosity in the range 47 to 100, and preferably in the range 50 to 70. Filaments having a relative viscosity below about 47 do not exhibit the superior properties found in the fibers of this invention. The polymer fed to the spinning apparatus must have a relative viscosity sufficiently high to allow for an appreciable drop in relative viscosity during the spinning process, the specific values used being dependent upon the final relative viscosity desired and the temperatures and apparatus employed in the spinning process. Usually, it will be necessary to supply to the spinning machine a polymer having a relative viscosity at least 2 units higher than that desired in the final yarn, and in many cases at least 6 to 10 units higher.

High molecular weight polyethylene terephthalate may be prepared by procedures and catalysts previously disclosed, for example, in U.S. Patents 2,916,474, 2,647,885, and 2,534,028, all assigned to the assignee of the present application. However, although methods have been described for preparing polyethylene terephthalate polymer with a relative viscosity above 47, no record is known which indicates that such a polymer had been melt spun into yarn. The absence of prior disclosure of melt spun polyethylene terephthalate yarns having a relative viscosity in the range 47 to 100 is understandable when one considers the difficulty of handling polymers of such high melt viscosity, the need for higher than normal spinning temperaturees, and the need for reinforced equipment to handle high pressures, along with the previously held opinion that no advantage in yarn properties was to be expected for polymers having a relative viscosity above about 35 or 40.

The difficulty of handling molten polyethylene terephthalate with relative viscosities in the range described herein is better appreciated if one compares the melt viscosity with that of nylon. In the following table the melt viscosity of polyethylene terephthalate and 66 nylon, measured at shear rates less than 10 sec.$^{-1}$, are contrasted at two different levels of relative viscosity.

| Relative Viscosity (10% Solution) | Melt Viscosity, Poises (304° C.) | |
|---|---|---|
| | 66 Nylon | Polyethylene Terephthalate |
| 50 | 750 | 10,000 |
| 70 | 1,700 | 25,000 |

The fibers of this invention are prepared by melt spinning procedures; polyethylene terephthalate yarns having the superior properties described herein have not been obtained by wet spinning or dry spinning procedures. With the higher viscosity polymers, it sometimes may be desirable to modify the melt spinning process by adding a plasticizing agent to the polymer to reduce the melt viscosity somewhat.

The spinning conditions must be such that there is an unusually low tension on the solidifying filaments so that the spun yarn, before drawing, is characterized by a very low degree of molecular orientation. The absence of orientation in the spun yarn is essential if the necessary draw ratios are to be achieved in the subsequent drawing operation. The spun yarn should have an optical birefringence value less than about 0.0030 and preferably lower than about 0.0020. To achieve these values of birefringence, the tension in the spinning threadline, measured at a point below the quenching zone before the solidified fringence touch any solid surface, must be less than about 0.028 gram per denier, and preferably below 0.012 g.p.d. The denier referred to here is the denier of the solidified undrawn yarn. Lower threadline tensions are preferred with a practical lower limit being about 0.001 g.p.d.

A preferred method for achieving low threadline tension in the melt spinning of high molecular weight polyethylene terephthalate is to delay solidification of the filaments by retarding cooling of the polymer for several inches immediately below the spinneret, i.e., by delayed quenching. The rate of cooling should be retarded so that most of the reduction in denier occurs before the filaments have solidified sufficiently to develop internal strains. Regulation of the cooling rate may be achieved by surrounding the filament bundle, immediately below the spinneret, with a suitable heating apparatus, e.g., a muffle furnace or a heated cylinder. In a preferred arrangement, a flow of gas (e.g., dry air or an inert gas) heated to a temperature above the melting point of the polymer, i.e., above about 270° C., and preferably above about 300° C., is supplied to an enclosed space surrounding the extruded filaments immediately below the spinneret face. The enclosure should be arranged so that the heated gas remains in contact with the filaments for a distance of several inches. Retardation of cooling for a distance of 12 to 24 inches is usually sufficient for spinning speeds of about 500 y.p.m. and polymer viscosities of 45 to 60. At higher speeds and higher viscosities it may be necessary to retard cooling for distances up to about 4 feet.

In the preferred spinning process the initial cooling rate of the extruded filaments is regulated to fall within specified limits determined as follows: Let $T_s$=the temperature in degrees centigrade of the molten polymer as it is extruded from the spinneret. This spinning temperature should be at least 20° C. higher than the crystalline melting point (265° C. for polyethylene terephthalate) of the polymer spun. Let $T_g$=the temperature in degrees centigrade of the gaseous medium adjacent to the fiber at specified distances in the direction of travel of the fiber (measured from the spinneret). Let $$\Delta T = T_s - T_g$$

in ° C. Let $Y$=the distance $(d)$ from the spinneret face in the direction of travel of the fibers, in inches, multiplied by a velocity factor [500 divided by the spinning speed $(V)$ in yards per minute] and a denier factor [23 divided by the denier per filament $(F)$ of the solidified but undrawn fiber]. Thus $Y=d(500/V)(23/F)$. The product of the velocity and denier factors will be designated as K, hence $Y=Kd$. The temperature must be regulated so that the maximum cooling temperature gradient is expressed by $$\Delta T = 35 + 2(Kd)^2 \left(\frac{40}{RV}\right)^2$$

where RV is the relative viscosity of the polymer. Preferably the maximum temperature gradient is expressed by $$\Delta T = 20 + (Kd)^2 \left(\frac{40}{RV}\right)^2$$

Regulation should be so maintained until a ΔT value of at least about 130° C. is reached.

The temperature of the gas adjacent to the spinneret ($T_{go}$) should be, preferably, greater than the value $$\left(\frac{RV}{50}\right)^{1/2}$$

(300° C.). In general, it will be advantageous to use as high a value of $T_{go}$ as possible and still operate the spinning process. Too high a gas temperature will cause the polymer to "drip" from the spinneret. Depending on the exact spinning conditions, the maximum $T_{go}$ will be about 525° C.+(RV−50)1° C.

In a preferred process, the molten polymer is extruded into an atmosphere of inert gas, i.e., a gas substantially free of oxygen. Suitable inert gases are hot nitrogen and carbon dioxide, as well as inert organic vapors. The use of an oxygen-free gas immediately below the spinneret greatly reduces the degradation encountered at that point when polymers having a relative viscosity above about 50 or 55 are extruded into air. The use of an oxygen-free gas can reduce the normally encountered relative viscosity loss by as much as 5 to 6 units, while at the same time reducing the normally encountered gain in carboxyl group content by as much as 6 to 8 eq./$10^6$ g. The improvement obtained with an inert gas is even more pronounced when higher RV polymers are used, i.e., 75–100. The reduced carboxyl-group concentration obtained with inert-gas annealing is most apparent at the filament surface. Anionic dye absorption tests indicate 50 to 100% more free carboxyls in the surface of air-annealed filaments in comparison with inert-gas-annealed filaments.

It is considered that it is the melt viscosity of the extruded polymer and of the semi-molten filament that controls the effects of this process. If an extremely high molecular weight polymer having a relative viscosity of 60 to 100, for example, is mixed with a plasticizer, its viscosity at the extrusion temperature will be lowered. Such a polymer, for purposes of this invention, should be considered as having an effective molecular weight equal to a pure polymer having the same melt viscosity at the given temperature. For example, a polyethylene terephthalate of RV 70 containing 2% by weight of diphenoxyethane has a melt viscosity of 19,000 poises at 310° C. and at a shear rate less than 10 reciprocal seconds. Since a pure, unplasticized sample of polyethylene terephthalate of RV 64 has the same melt viscosity under these same conditions, the plasticized polymer should be considered as having an RV of 64 for determination of maximum quenching rate.

Below the regulated delayed-quenching zone the filaments are introduced into a rapid-quenching zone where unheated or cooled gas (air) is blown against the filaments, e.g., in a cross-flow pattern or in a radially inwardly applied pattern. The temperature of the threadline must be reduced to a point below the second order transition temperature, i.e., about 79° C., before the filaments are allowed to touch anything solid.

This process is characterized by a substantially lower spinning tension than is normally found. With polyethylene terephthalate the threadline tension, measured at a point where the filament temperature is less than the second order transition temperature (about 90° C.) should not exceed the following values.

| Polymer RV | Threadline Tension (grams/denier) | |
|---|---|---|
| | Maximum | Preferred |
| 40 | 0.017 | 0.012 |
| 50 | 0.011 | 0.008 |
| 60 | 0.007 | 0.005 |

Generally, the threadline tension should be less than the value defined by the equation, $$\log_{10} \text{tension} = -0.019 RV - 1.01$$

This process is also characterized by moderate spin-stretch ratios, e.g., the spinning speed of the solidified filaments divided by the velocity of the molten polymer through a 12-mil orifice is less than about 70. Both the spinning speed and the threadline tension refer to measurements made after the filaments have cooled below the second order transition temperature and before being subjected to increased tension in any subsequent drawing operation which may be coupled with the spinning process. The spinning speed is preferably less than 1300 yards per minute and, in a coupled process, should preferably be about 200 to 500 y.p.m. (the windup speed after drawing in a coupled process is much higher, of course).

This process is of greatest utility when spinning under conditions such that the product of the relative viscosity and the spinning speed in yards per minute is equal to or greater than 10,000 and less than 50,000.

The next essential step in preparing the yarns of this invention is to hot draw the unoriented spun yarn. The drawing step may be coupled to the spinning step so that a continuous process is obtained, or the spun yarn may be packaged and later drawn in a separate operation. Draw ratios lower than 5.7:1 do not produce sufficient orientation in the fibers to meet the requirements of the present invention. Draw ratios higher than about 10 are usually impractical because of operating difficulties, broken filaments, and the like. In a preferred drawing process the yarn is drawn in a steam jet, where high velocity superheated steam is impinged upon the threadline to heat the yarn to drawing temperature. Steam temperatures in the range 175°–450° C. are suitable. Higher molecular weight yarns draw best at the higher temperatures. In this particular drawing process, cold feed rolls (i.e., less than 65° C.) and cold draw rolls may be used, although it may be desirable in some instances to use hot draw rolls, e.g., 140° C., to reduce residual shrinkage in the final yarn product and improve windup package formation.

In other variations of the process the yarn may be heated to drawing temperature in various known ways, e.g., by using hot rolls instead of steam. As one alternative, the unoriented spun yarn is preheated to a temperature of 80°–120° C. on heated feed rolls, passed to and around a set of first stage draw rolls heated to a temperature of about 150° C. and moving with a surface speed about 3.75–5 times that of the feed rolls, and then passed to a second set of draw rolls moving with a surface speed about 1.5–2 times that of the first stage draw rolls to give a total draw ratio in the range 5.7:1–10:1. The second stage draw rolls are heated to a temperature between 120°–225° C. From the second stage draw rolls yarn is passed to a conventional windup system. Windup speeds as high as 3,000 y.p.m. or higher may be used.

The above-mentioned steam drawing process is preferred because it gives yarns having higher long period spacing values than can be obtained by other drawing methods, starting with the same undrawn yarn. Furthermore, the yarns produced by steam drawing possess a highly desirable stress-strain curve (load vs. extension to break) which shows a fall-off in modulus immediately before the point of yarn break. More specifically, these yarns show a measured increase in load of only 0.6 to 2.0 g.p.d. for the last 2.5% extension before break on the stress-strain curve, referred to hereinafter as $(\Delta T)$ 2.5, with the best yarns showing $(\Delta T)$ 2.5 values less than about 1 g.p.d. High strength yarns having such a reduced modulus immediately before the break are found to exhibit an improved tenacity conversion factor in the transition from yarn to a twisted cord structure. The improved tenacity conversion is thought to be due to better transverse properties within the individual filaments. Typical stress-strain curves are illustrated in FIGURE 2, wherein the ordinate shows the measured load in grams per denier as a function of percent extension (abscissa) when a 10-inch specimen of the yarn is stretched at a uniform rate of 0.1 inch/second (1%/second), Curve A is representative of a yarn of this invention having a tenacity of 9.8 grams per denier and a break elongation of 16.5%, Curve B shows, for comparison, the load-extension relationship of a commercially available industrial yarn, composed of polyethylene terephthalate of relative viscosity about 30, drawn to have a tenacity of 7.8 g.p.d., and a break elongation of 12.5%, and Curve C shows the corresponding values after the yarn of curve B has been hot drawn to have a tenacity of 8.7 g.p.d., the break elongation then being only 6.4%.

For use in ropes and cordage a low break elongation is more valuable than improved tenacity conversion in the transition from yarn to a twisted cordage structure. Curve D is representative of a yarn of this invention which has been drawn to 10.8 grams per denier and a break elongation of 8% for such end uses.

For best results the drawn yarn of this invention should have measured denier-per-filament values in the range 1 to 15 (0.1–1.7 Tex), preferably in the range 3 to 12 (0.33–1.3 Tex). Accordingly, the denier-per-filament before drawing should be in the range 6–150 (0.67–17 Tex), and preferably 20–80 (2.2–9 Tex). A high degree of denier uniformity along individual filaments is achieved by the described process.

A surprising feature which appears to be inherent in the yarns of this invention is the fact that along with the excellent tensile properties shown, these yarns also show an unexpected degree of resistance to flex fatigue. In single filament flex tests, in which a filament is repeatedly bent 180° around a 3 mil wire mandrel, the yarns of this invention exhibit a minimum flex life of 50,000 cycles. Furthermore, examination of the filament at the point of flex by means of a microscope indicates that no fibrillation has occurred up to at least 32,000 cycles. Resistance to flex fatigue is especially important in reinforced rubber articles such as V-belts and pneumatic tires which are subjected constantly to sharp changes in load and configuration.

EXAMPLE I (a) Bis-β-hydroxyethyl terephthalate is prepared continuously from ethylene glycol and dimethyl terephthalate according to the procedure of Vodonik described in U.S. Patent No. 2,829,153, and conducted through a heated conduit to a second vessel for polymerization. In the second vessel the temperature of the monomeric mixture is raised and the pressure on the system reduced to remove vaporous by-products giving low molecular weight prepolymer. About 0.1% $TiO_2$ (based on polymer weight) is added as a glycol slurry. The liquid prepolymer having an intrinsic viscosity of about 0.2 is fed continuously into a stirred polymerization vessel (finisher) where the temperature is raised to about 310° C. and the absolute pressure reduced to about 1 mm. of mercury. Polymerization is continued until the relative viscosity of the polymer rises to about 57.

The high viscosity polymer prepared above is pumped from the finisher, through heated conduits, to a spinning machine, where the polymer is melt spun at a temperature of 300° C. ($T_s$), using a conventional sand pack and a spinneret having 192 holes, with a hole diameter of 12 mil. Directly below the spinneret the extruded filaments pass through a vertically disposed heated cylindrical tube, 12 inches in length, to greatly retard cooling of the filaments for that distance. The nominal temperature of the tube (referred to as an "annealer") is 375° C.

Measurement of the gas temperature adjacent to the filaments at several distances from the spinneret gives the values of Tg shown in the following table. Values of Y are calculated using a K value of 1.68.

| d, inches | $T_g$, °C. | ΔT, °C. | Y, inches |
|---|---|---|---|
| 0.0 | 360 | −60 | 0.0 |
| 6.0 | 350 | −50 | 10.1 |
| 10.0 | 276 | 26 | 16.8 |
| 12.0 | 176 | 124 | 20.2 |

Leaving the protection of the heated cylinder the extruded filaments then encounter cross-flow cooling air, as disclosed in U.S. Patent No. 2,273,105, to quench the filaments. The threadline tension is 0.0026 g.p.d. The filaments then pass over a finish roll where a lubricating finish is applied, and then around an unheated feed roll operating at a speed of 250 y.p.m. Samples of yarn taken at this point have a birefringence of 0.0005.

From the feed roll the threadline next passes through a steam jet where steam at a temperature of 350° C. is impinged upon the threadline to heat the yarn and establish a draw point. From the steam jet the yarn passes to a second finish applicator and then around a draw roll operating at a speed sufficient to draw the yarn to 6.25 times its undrawn length. The threadline then passes to a conventional windup.

The 840 denier (93 Tex) yarn produced is found to have a denacity of 9.6 g.p.d., a break elongation of 15% and a $(\Delta T)_{2.5}$ value of 0.77 g.p.d. Tenacity referred to denier at break is 11.2 g.p.d. The loop tenacity of the yarn is found to be 5.1 g.p.d., giving a ratio of loop tenacity to straight tenacity of 0.53. The yarn is found to be composed of polymer having a relative viscosity of 52, and to contain no more than 3 mol percent ether groups, calculated as diethylene glycol. The yarn is further characterized by a density of 1.3923 gm./cc., a sonic velocity value of 4.82 km./sec., and a long-period spacing value of 180 A. The corresponding value of X is 4.32 (calculated from the formula defined previously), and these values are within the area of high performance shown in FIGURE 1.

A tire cord of 840/2 (93 Tex/2 ply) construction is prepared by twisting the yarn prepared above 12.5 turns per inch Z in the singles, then plying two ends and twisting the plied yarn 12.5 turns per inch S. The cord is "hot stretched" in two stages, the first stage being carried out with −2% stretch at 232° C., and the second stage being caried out with 5% stretch, based on initial length at 177° C. In both stages the exposure time is 80 seconds. The breaking strength of the cord is measured and found to be 7.8 g.p.d., or 81% of the value which might have been expected for 100% conversion of the tenacity of the starting yarns.

(b) The critical importance of high relative viscosity polymer is shown by repeating the above procedure (a) except that the polymer fed to the spinning position has a relative viscosity of 29. The yarn is spun and drawn in essentially the same manner to give a yarn having a density of 1.3952 gm./cc., a sonic velocity of 4.57 km./sec., and a long-period spacing of 156 A. The corresponding value of X is 2.86 and these values are outside of the area of high performance shown in FIGURE 1. When twisted into cord as in (a) above, the cord is found to have a breaking strength of only 5.3 g.p.d. The tenacity conversion ratio in this instance is only 61%.

(c) The critical importance of the spinning conditions is shown when procedure of (a) is repeated with the exception that no attempt is made to control the cooling of the spun filaments immediately below the spinneret, i.e., there is no "annealer" to delay cooling and the filaments are exposed to cross-flow cooling air as soon as they leave the spinneret face. The threadline tension is found to be 0.0285 g.p.d., and the spun yarn birefringence 0.0080. It is found to be impossible to draw these filaments at a draw ratio higher than about 4.2:1, with the result that the fully drawn yarn has a tenacity of only 6.3 g.p.d., and a $(\Delta T)_{2.5}$ value of about 2.5 g.p.d. Further examination of the yarn shows it to be characterized by a density of 1.3950 gm./cc., a sonic velocity of 4.30 km./sec., and a long-period spacing of 145 A. The corresponding value of X is 2.97 and these values are outside of the area of high performance shown in FIGURE 1. Cord prepared from this yarn has a breaking strength of 4.5 g.p.d., indicating a tenacity conversion of only 71%.

EXAMPLE II

A series of polymer samples, prepared from dimethyl terephthalate and ethylene glycol by known methods, are melt spun as in Example I(a) and drawn using the conditions summarized in Table I. Two different drawing procedures are shown, one being a two-stage hot roll drawing process and the other being a single-stage process in which the yarn passes through a steam jet at the draw point. The properties of the drawn yarn are shown in Table II.

Samples of tire cord are prepared from each yarn by twisting singles 12½ turns S, plying two ends and then twisting 12½ turns Z. The cord is then hot stretched in a two-stage stretching process, the first stage consisting of a 5% stretch at 205° C. and the second stage consisting of 0% stretch at 220° C. These conditions produce cords having a twist multiplier of about 7.5. Cord tenacity figures are shown in the table.

The data included for control sample K illustrate the properties characteristic of presently available commercial industrial yarns of polyethylene terephthalate (Du Pont's type 52 "Dacron" polyester yarn). The superiority of the yarns of this invention over the control yarn is obvious from an inspection of the data in the tables. Also samples A to I of this invention have values of long-period spacing (LPS) and X (calculated as previously defined) which are within the area of high performance shown in FIGURE 1, whereas control sample K has values outside the area ABCDEF.

*Table I*

| Sample Code | Spinning Conditions | | | | | Drawing Conditions | | | | | | |
|---|---|---|---|---|---|---|---|---|---|---|---|---|
| | Spinneret Assembly °C. | Number of Filaments | Annealer Length Inches* | Speed, y.p.m. | Spun Yarn Birefringence | Feed Roll | | Steam Jet Temp., °C. | 1st Draw Roll | | 2nd Draw Roll | | Total Draw Ratio |
| | | | | | | Temp., °C. | Speed, y.p.m. | | Temp., °C. | Speed, y.p.m. | Temp., °C. | Speed, y.p.m. | |
| A | 305 | 192 | 15 | 250 | 0.0009 | 102 | 250 | None | 150 | 1,080 | 225 | 1,600 | 6.42 |
| B | 290 | 192 | 15 | 298 | 0.0015 | 109 | 298 | None | 155 | 1,300 | 224 | 1,900 | 6.38 |
| C | 290 | 192 | 13 | 298 | 0.0010 | 109 | 298 | None | 155 | 1,300 | 224 | 2,012 | 6.76 |
| D | 310 | 192 | 13 | 250 | 0.0009 | Cold | 250 | 355 | Cold | 1,585 | | | 6.36 |
| E | 300 | 192 | 15 | 250 | 0.0006 | Cold | 250 | 360 | Cold | 1,575 | | | 6.30 |
| F | 325 | 100 | 12 | 250 | 0.0018 | Cold | 250 | 400 | Cold | 1,600 | | | 6.4 |
| G | 325 | 100 | 12 | 250 | 0.0021 | Cold | 250 | 400 | Cold | 1,675 | | | 6.7 |
| H | 320 | 100 | 12 | 250 | 0.0027 | Cold | 250 | 450 | Cold | 1,675 | | | 6.7 |
| I | 320 | 100 | 12 | 250 | 0.0024 | Cold | 250 | 450 | Cold | 1,736 | | | 6.9 |
| K (Control) | 294 | 200 | None | 542 | 0.0012 | 80 | 542 | None | 125 | 2,225 | 165 | 3,053 | 5.63 |

*Annealer tube heated to 375°–450° C.

Table II

| Sample Code | RV | Denier | Tenacity, g.p.d. | Break Elongation, percent | Initial Modulus, g.p.d. | $(\Delta T)_{2.5}$ | Loop T/ Straight T | Stretched Cord Tenacity, g.p.d. | LPS, A. | Sonic Velocity, km./sec. | Density, gm./cc. | X |
|---|---|---|---|---|---|---|---|---|---|---|---|---|
| A | 49 | 829 | 9.2 | 15.6 | 116 | 0.8 | 0.57 | 7.2 | 148 | 4.92 | 1.3814 | 4.69 |
| B | 52 | 705 | 9.7 | 15.1 | 131 | 1.03 | 0.52 | 7.1 | 150 | 4.97 | 1.3800 | 4.95 |
| C | 53 | 701 | 10.2 | 14.3 | 112 | 1.84 | 0.56 | 7.2 | 155 | 5.10 | 1.3830 | 5.24 |
| D | 47 | 864 | 9.0 | 11.5 | 151 | 0.78 | 0.50 | 7.3 | 160 | 4.70 | 1.3930 | 3.83 |
| E | 50 | 838 | 9.39 | 11.9 | 135 | 0.9 | | 7.3 | 174 | 4.82 | 1.3943 | 4.20 |
| F | 70 | 435 | 10.25 | 13.0 | 138 | 0.8 | | 8.2 | 180 | 4.75 | 1.3950 | 4.73 |
| G | 70 | 430 | 11.5 | 11.2 | 140 | 1.5 | | 8.1 | 194 | 5.00 | 1.3935 | 5.38 |
| H | 90 | 418 | 11.2 | 12.4 | 136 | 0.8 | | 8.9 | 185 | 4.80 | 1.3920 | 5.62 |
| I | 90 | 426 | 12.2 | 11.0 | 145 | 1.9 | | 8.8 | 200 | 5.00 | 1.3940 | 6.08 |
| K | 29 | 844 | 7.6 | 11.9 | 115 | | | 5.9 | 148 | 4.44 | 1.3820 | 2.78 |

EXAMPLE III

The yarn from sample D of Example II is plied and twisted to give a tire cord of 850/½ construction having a twist multiplier of 7.5. In a two stage hot stretching process the cord is first dipped in an aqueous mixture containing a polyepoxide (Shell's Eponite 100) and dispersed finely-divided phenol adduct of methylene-bis-4-phenol-isocyanate, and then stretched 5% at 205° C. with an exposure time of 60 seconds. The cord is then dipped in a resorcinol-formaldehyde-vinyl pyridine latex adhesive and stretched 0% at 210° C., again with an exposure time of 60 seconds. The cord produced has a total denier of 1,787 (199 Tex) a tenacity of 7.3 g.p.d., and an elongation of 12.9%. The cord thus prepared is used to build a 4-ply 8.50 x 14 automobile tire by standard methods known to the art. The tire is then subjected to an accelerated endurance test in which the tire is run against a steel wheel, four feet in diameter, at 35 miles per hour under conditions of inflation and load which allow 24% flex in the tire profile. The ambient temperature is 100° F. After completion of the test, the tire is dissected and the breaking strength of the cord is determined using an "Instron" tensile tester. The results are calculated in terms of percent strength loss per 1,000 miles. The cords of this invention are found to suffer a strength loss of 2.5% per 1,000 miles. In comparison, an equivalent tire prepared from commercially available polyethylene terephthalate industrial yarn (Sample K of Example II) shows a strength loss of 11.5% per 1,000 miles in the same test.

In a carcass strength test, a tire prepared as above from the yarn of this invention is found to give a plunger energy value of 10,784 inch-pounds whereas a control tire of equivalent construction, prepared from commercially available yarn, gives a plunger energy value of 8,451 inch-pounds. These values indicate a 27% increase in strength in tires prepared from the yarns of this invention.

In other respects the tire is found to be at least equivalent in all-around performance to nylon reinforced tires, and far superior to nylon tires in one important characteristic. Nylon tires, well recognized as the best commercially available tires, suffer from a phenomenon known as "flat spotting" which gives rise to "tire thump." Tires prepared from the polyethylene terephthalate cords do not exhibit "flat spotting."

EXAMPLE IV

Molten polyethylene terephthalate having a relative viscosity of 60 is fed to a spinning machine, forced through a sand pack, and extruded through a 192-hole spinneret having a temperature of 315° C. ($T_s$). The extruded filaments are surrounded immediately below the spinneret with an insulated cylindrical foraminous collar (annealer) 5" in length through which a mixture of nitrogen and carbon dioxide at a temperature of 335° C. is directed radially inwardly at the filaments. The foraminous collar has a 19" long insulated cylindrical skirt attached, forming a chamber in which the extruded filaments remain in contact with the hot inert gas for a distance of 24 inches. Measurement of the gas temperature adjacent to the filaments at several distances from the spinneret gives the values of $T_g$ shown in the following table. Values of Y are calculated using a K value of 0.88.

| d, inches | $T_g$, ° C. | $\Delta T$, ° C. | Y, inches |
|---|---|---|---|
| 0 | 325 | −10 | 0 |
| 7 | 307 | 8 | 6.2 |
| 16 | 262 | 53 | 14 |
| 21 | 225 | 86 | 18.4 |
| 24 | 173 | 142 | 21.1 |

About 6" below the skirt of the hot zone the extruded filaments enter a second cylindrical foraminous tube, approximately 16" long, through which room temperature air is directed radially inwardly at the filaments to strip off the hot gas of the first zone and initiate quenching of the filaments. Passing downwardly from this quenching cylinder, the filaments pass through approximately 30" of quiescent room temperature air and then enter a vertically disposed, open-ended, cocurrent quenching tube approximately 7 ft. long and 9" in diameter through which room temperature air is pumped by the motion of the filaments themselves. The threadline tension at the bottom of the cocurrent quenching tube is approximately 0.007 g.p.d. and the filament temperature about 50° C. The quenched filaments next contact a finish roll where an antistatic lubricating finish is applied, and then pass over a feed roll running at 500 y.p.m. and maintained at a temperature of 50° C. From the feed roll the threadline passes through a steam jet where steam at a temperature of 400° C. is impinged upon the yarn to initiate drawing, then to and around a pair of draw rolls running at 3,000 y.p.m. and maintained at a temperature of 160° C. The drawn yarn is interlaced by passing it through a jet as described in U.S. 2,985,995, and then wound into a conventional package.

In critical characterization tests described elsewhere, the drawn yarn is found to have long-period X-ray spacing values of 174 A., a sonic velocity of 4.65 km./sec. (measured at 3.0 g.p.d.) a polymer relative viscosity of 52, and an average filament density of 1.3994 gm./cc. The corresponding value of X (calculated from the formula defined previously) is 3.69, and these values are within the area of high performance shown in FIGURE 1.

The yarn produced has a denier of 840 (93 Tex) tenacity of 9.3 g.p.d. at 14% elongation (a tenacity of 10.6 g.p.d. referred to denier at break), and an initial modulus of 115 g.p.d. Single-filament flex tests give average flex lives of about 160,000 cycles. When the yarn is converted into an 840/2 tire cord with 11 turns "S" in the singles and 11.5 turns "Z" in the ply, a tenacity conversion of about 85% is obtained.

EXAMPLE V

To illustrate the relationship between filament structure and yarn performance, a series of polyethylene terephthalate yarns were prepared with physical properties falling into two groups. The first of these groups referred to as the test samples, were yarns with properties and performance characteristic of the yarns of this invention, i.e., high strength and superior flex life. The second group, referred to as the control samples, contained yarns with performance features characteristic of the prior art. Structural characterization tests, described previously, were carried out on all yarns with the results shown in Table III, where yarn tenacity (referred to denier at break) is also shown as an indication of the performance of the yarn. The data in the table have also been used to locate the samples on the graph of FIGURE 1. It is noted that all of the test samples lie within the area ABCDEF, while all of the control samples lie outside of that area.

*Table III*

| Sample | Yarn Structure | | | | Yarn Tenacity (referred to denier at break), g.p.d. |
|---|---|---|---|---|---|
| | Long Period Spacing, A. | Sonic Velocity, km./sec. | Density, cm./cc. | Relative Viscosity | |
| Test Samples: | | | | | |
| Va | 174 | 4.82 | 1.3943 | 52 | 10.4 |
| Vb | 180 | 4.82 | 1.3923 | 51 | 10.7 |
| Vc | 175 | 4.50 | 1.3940 | 50 | 10.6 |
| Vd | 168 | 4.72 | 1.3960 | 50 | 10.3 |
| Ve | 148 | 4.92 | 1.3814 | 50 | 10.7 |
| Vf | 149 | 4.86 | 1.3805 | 50 | 10.9 |
| Vg | 194 | 4.73 | 1.4010 | 53 | 10.8 |
| Vh | 213 | 4.79 | 1.4014 | 68 | 10.9 |
| Vi | 191 | 4.91 | 1.4005 | 65 | 11.0 |
| Vj | 140 | 5.60 | 1.4001 | 80 | 12.4 |
| Vk | 170 | 5.20 | 1.3950 | 90 | 13.0 |
| Control Samples: | | | | | |
| Vl | 136 | 4.12 | 1.3924 | 29 | 6.77 |
| Vm | 153 | 4.21 | 1.3918 | 48 | 7. |
| Vn | 148 | 4.49 | 1.3953 | 28 | 8.5 |
| Vo | 138 | 4.12 | 1.4067 | 35 | 5.5 |
| Vp | 148 | 3.82 | 1.4055 | 29 | 8.2 |

EXAMPLE VI

Polyethylene terephthalate yarn is prepared according to the general procedure of Example IV with the exception of the following specified machine settings:

The annealer gas temperature is 400 instead of 335° C.
The feed roll speed is 456 y.p.m. instead of 500 y.p.m.
The feed roll temperature is 30° C. instead of 50° C.
The draw roll temperature is 80° C. instead of 160° C.
The polymer supply pump is adjusted to give a drawn denier of 1100 (120 Tex).

Examination of the yarn produced reveals a long-period X-ray spacing value of 197 angstrom units, a sonic velocity of 4.82 km./sec., a polymer relative viscosity of 50, and an average filament density of 1.401 grams per cc. The 1100-denier yarn has a tenacity of 10.4 g.p.d. at 9.4% elongation (a tenacity of 11.4 g.p.d. referred to denier at break), and an initial modulus of 150 g.p.d. The yarn is plied and twisted into a ½-inch diameter rope weighing 6.2 lbs. per 100 feet. The rope is found to have a breaking strength of 5,892 lbs. and a break elongation 28.0% (maritime standards call for less than 35% elongation to minimize stretch when used as harbor tow lines).

In preparing reinforced elastomeric structures from polyethylene terephthalate cords, it is necessary to apply an adhesive coating of some sort to the cords. Any adhesive mixture may be used if it gives the desired level of adhesion between cord and elastomer. For example, the cord may be coated with an organic solvent solution of a rubber and a polyisocyanate as described in U.S. Patent No. 2,415,839. Alternatively, the cord may be coated with an aqueous dispersion of a blocked isocyanate and a latex as described by Thomson in U.S. Patent No. 2,994,671. In a preferred adhesive system, the cord is coated first with a mixture of a polyepoxide and a blocked isocyanate, cured, and then overcoated with a standard resorcinolformaldehyde-latex adhesive.

In order to obtain top level performance from reinforced rubber articles, it is a general practice to first combine yarn ends into a cord of the desired size and twist, and then apply heat to the cord under tension in order to stabilize the cord properties and thereby reduce both shrinkage and growth, as well as to obtain higher applied to the cord immediately prior to the hot tension-strength. Advantageously, the adhesive mixture may be ing operation so that the adhesive is cured onto the cord during the heating step. Alternatively, the adhesive may be applied and dried onto the cord in a separate operation.

The yarns and cords of this invention, which have been described particularly with respect to pneumatic tires, are useful in many types of reinforced rubber articles. Their particular advantage appears when it is desired to prepare a light-weight reinforced rubber article having great strength. Other articles which may advantageously be reinforced with the polyethylene terephthalate yarns and cords of this invention include V-belts, flat belts, tarpaulins, and other rubber-coated fabrics, hydraulic hose for use in automobiles and other vehicles, reinforced rubber bellows in air-spring suspension systems for automotive vehicles, steam hose, and the like. In addition to their use in reinforced rubber articles, the yarns and cords of this invention also offer many advantages in other uses such as high-strength ropes and cordage, fire hose, sailcloth and sewing thread, particularly where a combination of high tensile strength, good transverse properties and low extensibility is needed.

Since many different embodiments of the invention may be made without departing from the spirit and scope thereof, it is to be understood that the invention is not limited by the specific illustrations except to the extent defined in the following claims.

We claim:

1. High-performance polyethylene terephthalate fibers having a molecular and crystalline structural configuration characterized by,
   (a) a long-period spacing value of 125 to 240 angstrom units as determined by low angle X-ray scattering measurements,
   (b) a sonic velocity (SV) value of 4 to 6 kilometers per second as determined by passing a sound wave having a frequency of 10,000 cycles per second through filaments held under a stretching tension of 3.0 grams per denier,
   (c) a density ($\rho$) value of 1.37 to 1.42 grams per cubic centimeter,
   (d) a relative viscosity (RV) value of 47 to 100 as determined for a 10 percent solution of the polyester in a mixture of 10 parts by weight of phenol and 7 parts by weight of 2,4,6-trichlorophenol, and (e) a combination of the above values wherein X, calculated from the formula $$X = 2.475(SV) - 20.71(\rho) + 0.03539(RV) + 19.39,$$

is within the range from $X=2$ to $X=8$ and the long period spacing value is within the area surrounded by the solid line ABCDEF in FIGURE 1 of the drawing.

2. A high strength yarn of polyethylene terephthalate fibers as defined in claim 1 having a tenacity of 10 to 15 grams per denier at break as determined with an elongation rate of 1 percent per second.

3. A high strength yarn as defined in claim 2 having high resistance to flex fatigue, the yarn filaments having flex lives of at least 50,000 cycles as determined by repeatedly bending the filament 180° about a 0.003 inch diameter wire at a rate of 155 cycles per minute.

4. A high strength yarn as defined in claim 2 showing a measured increase in load of 0.6 to 2.0 grams per denier for the last 2.5 percent elongation before break.

5. Tire cord formed of polyethylene terephthalate yarn as defined in claim 2.

6. Rope formed of polyethylene terephthalate yarn as defined in claim 2.

7. High strength yarn, having a tenacity of 10 to 15 grams per denier at break when elongated 1 percent per second until broken, of polyethylene terephthalate fibers having a relative viscosity (RV) value of 47 to 100 and a molecular and crystalline structural configuration characterized by a long-period spacing value of 165 to 240 angstrom units.

8. A high strength yarn of polyethylene terephthalate fibers having a molecular and crystalline structural configuration characterized by a long-period spacing value of 165 to 240 angstrom units, a sonic velocity (SV) value of 4 to 6 kilometers per second, a density ($\rho$) value of 1.37 to 1.42 grams per cubic centimeter, a relative viscosity (RV) value of 50 to 70, and a value of X calculated from the formula $$X = 2.475(SV) - 20.71(\rho) + 0.03539(RV) + 19.39$$

which is within the range from $X=2$ to $X=8$.

9. Yarn as defined in claim 8 wherein the fiber denier is within the range of 3 to 12 denier per filament.

References Cited by the Examiner

UNITED STATES PATENTS

| | | | |
|---|---|---|---|
| 2,857,363 | 10/58 | Easley | 260—75 |
| 2,916,474 | 12/59 | Engle | 260—75 |
| 2,942,325 | 6/60 | Spellman | 264—210 X |
| 3,051,212 | 8/62 | Daniels | 260—75 X |

FOREIGN PATENTS

| | | |
|---|---|---|
| 831,961 | 4/60 | Great Britain. |
| 839,845 | 6/60 | Great Britain. |

MERVIN STEIN, *Primary Examiner.*